(12) United States Patent
Anderson

(10) Patent No.: US 8,421,399 B2
(45) Date of Patent: Apr. 16, 2013

(54) ENERGY SAVER DELAY CIRCUIT FOR AC INDUCTION MOTORS

(75) Inventor: Nicholas Anderson, Bayside, NY (US)

(73) Assignee: Energy Innovative Products, LLC, Roseland, NJ (US)

( * ) Notice: Subject to any disclaimer, the term of this patent is extended or adjusted under 35 U.S.C. 154(b) by 554 days.

(21) Appl. No.: 12/258,006

(22) Filed: Oct. 24, 2008

(65) Prior Publication Data

US 2010/0102771 A1   Apr. 29, 2010

(51) Int. Cl.
*H02P 27/00* (2006.01)
*H02P 3/18* (2006.01)

(52) U.S. Cl.
USPC ............ 318/809; 318/729; 318/799; 318/810

(58) Field of Classification Search .................. 318/809, 318/729, 810, 799
See application file for complete search history.

(56) References Cited

U.S. PATENT DOCUMENTS

| | | | |
|---|---|---|---|
| 4,266,177 A | | 5/1981 | Nola |
| 4,298,834 A | * | 11/1981 | Opfer ............................ 318/729 |
| 4,361,792 A | * | 11/1982 | Davis et al. ................... 318/729 |
| 4,384,243 A | * | 5/1983 | Muskovac ..................... 318/729 |
| 4,400,657 A | * | 8/1983 | Nola .............................. 318/798 |
| 4,404,511 A | * | 9/1983 | Nola .............................. 318/729 |
| 4,439,718 A | * | 3/1984 | Nola .............................. 318/729 |
| 4,800,326 A | * | 1/1989 | Unsworth ...................... 318/729 |
| 5,304,911 A | | 4/1994 | Anderson |
| 5,389,869 A | | 2/1995 | Anderson |
| 5,442,271 A | * | 8/1995 | Hatanaka et al. ............. 318/729 |
| 5,455,491 A | * | 10/1995 | Hajagos et al. ............... 315/291 |
| 6,249,095 B1 | | 6/2001 | Takura |
| 7,638,966 B1 | * | 12/2009 | Pummer ........................ 318/729 |

* cited by examiner

*Primary Examiner* — Bentsu Ro
*Assistant Examiner* — Gabriel Agared
(74) *Attorney, Agent, or Firm* — SNR Denton US LLP

(57) ABSTRACT

A power control system for an A.C. induction motor is disclosed, comprising a voltage/current phase difference generator for determining a difference in phase between a voltage applied to the motor and a current drawn by the motor, and for generating a phase difference signal as a function of the determined difference in phase, the voltage/current phase difference generator including an integrator, the integrator receiving the phase difference signal and generating an error signal for controlling an amount of power supplied to the motor as a function of the phase difference signal, the integrator being electrically coupled to a potentiometer, the potentiometer providing a bias signal for at least partially controlling the error signal; and a delay circuit for controlling the bias signal provided by the potentiometer so as to cause full available power to be supplied to the motor for a predetermined amount of time. The potentiometer further comprises first and second outer terminals and a center tap terminal, the center tap terminal providing the bias signal. The delay circuit controls the resistance appearing across the first outer terminal and second outer terminal of the potentiometer for the predetermined amount of time.

13 Claims, 5 Drawing Sheets

ENERGY SAVER DELAY CIRCUIT FOR AC INDUCTION MOTORS

FIELD OF THE INVENTION

The present invention relates generally to AC induction motors, and more particularly to a power factor control system for AC induction motors which includes a timer circuit for delaying the operation of the power factor control system.

BACKGROUND OF THE INVENTION

The difference in phase between the voltage supplied to an induction motor and the resulting current through the motor, known as the power factor, is indicative of the load on the motor. It is known for a power control system to be connected to a motor in order to detect and compare the supplied-voltage and resulting-current signals. Based upon this comparison, the power control system may control the voltage applied to the motor, which in turn controls the flow of current to the motor, in order to reduce the power consumed by a less than fully loaded motor.

U.S. Pat. No. 4,266,177 to Nola, for example, describes a power control circuit for an induction motor (hereinafter "the Nola '177 circuit"), wherein a servo loop is used to control the voltage applied to the motor, which in turn controls the flow of current to the motor, in order to reduce the power consumed by the motor. In particular, a pulse signal is used to control the "on" time of a triac which is in circuit with the motor in order to maintain motor operation at a selected power factor. The pulse signal is based upon the measured current-voltage phase angle.

Power factor controllers of the prior art, such as the one just described, use an integrator as part of the processing required to produce the pulse signal. Typically, the integrator includes an operational amplifier and a filter which includes a capacitor and provides a single path of feedback from the output of the operational amplifier to one of the inputs of the operational amplifier. A command signal circuit is also connected to one of the inputs of the operational amplifier, which is typically the same input to which the filter is connected. Conventionally, the command signal circuit contains a potentiometer. The potentiometer must be adjusted for the particular motor being controlled in order to provide a proper bias voltage to the operational amplifier. In effect, it sets a selected power factor (or phase angle between current and voltage) as determined by the greatest power factor (smallest motor current-voltage phase difference) at which the motor will operate over a range of loadings to be encountered. The resulting control signal is a negative signal which shifts positively responsive to the presence of a higher than commanded power factor, and shifts negatively when there is detected a lower than commanded power factor. It is employed in a servo loop to vary the applied voltage and control the input power to the motor. In this way, the motor is forced to operate at the selected power factor. In such circumstances, this enables motors which are less than fully loaded to draw significantly reduced power.

Power factor controllers require a power supply in order to provide an operating bias voltage of, for example, 15 volts, to the controller's active components, such as the operational amplifier of the integrator, so that the pulse signal is provided to the triac Exemplary transformer-less power supplies are employed. However, in such cases, relatively large capacitors are typically necessary, and this slows full voltage output and start-up time of the circuitry. This in turn may prevent a motor from having a sufficient starting voltage (average voltage through triac) initially applied to it for effective starting. To compensate for this, a delay circuit is employed which delays any power from being applied to motor until operating biases are essentially at full operating levels.

Unfortunately, the delays provided by such delay circuits may be too short during times of high temperature stresses, as would occur during summer months for air conditioning system and refrigeration systems. In such circumstances, the voltage supplied by the power company is lowered in response to the heavy loads produced by the very same air conditioning systems. The voltage supplied by the power companies is lowered to just above the level of adequate operation of such systems. Further, these air conditioning and refrigeration systems need even more time for the pressures in the compressor portion of such systems to stabilize and for back pressures to have been eliminated. It is therefore necessary to apply as much of the full supply voltage as possible for longer periods of time than can be provided by the time delay circuits employed in existing power factor controllers based on the Nola '177 circuit. Any energy saving circuit/power factor controller operating in a similar fashion to the Nola '177 circuit would lower the voltage supplied to AC induction motors even further, often leading to catastrophic failures of the AC induction motors.

Accordingly, what would be desirable, but has not yet been provided, is a system for delaying the operation of energy savings/power factor controller, such as the Nola '177 circuit, or conversely causing such circuits to apply maximum available supply voltage for a longer period of time that has been previously provided until the system employing the AC induction motor has stabilized.

SUMMARY OF THE INVENTION

The above-described problems are addressed and a technical solution is achieved in the art by providing a power control system for an A.C. induction motor, comprising: a voltage/current phase difference generator for determining a difference in phase between a voltage applied to the motor and a current drawn by the motor, and for generating a phase difference signal as a function of the determined difference in phase, the voltage/current phase difference generator including an integrator, the integrator receiving the phase difference signal and generating an error signal for controlling an amount of power supplied to the motor as a function of the phase difference signal, the integrator being electrically coupled to a potentiometer, the potentiometer providing a bias signal for at least partially controlling the error signal; and a delay circuit for controlling the bias signal provided by the potentiometer so as to cause full available power to be supplied to the motor for a predetermined amount of time. The potentiometer further comprises first and second outer terminals and a center tap terminal, the center tap terminal providing the bias signal. The potentiometer further comprises first and second outer terminals and a center tap terminal, the center tap terminal providing the bias signal. The delay circuit controls the resistance appearing across the first outer terminal and second outer terminal of the potentiometer for the predetermined amount of time.

The delay circuit further comprises: a DC power supply having a DC supply voltage derived from an alternating current source; a delay timer having an input for receiving the DC supply voltage from the DC power supply and an output for outputting at least a portion of the DC supply voltage for the predetermined amount of time; a comparator having an input, the input of the comparator being electrically connected to the output of the delay timer, the comparator being configured to operate in a low state for the predetermined amount of time after receiving the at least a portion of the DC supply voltage from the delay timer and to operate in a high state thereafter; and a relay having a drive coil and a pair of output contacts, the drive coil being in electrical communication with and driven by the comparator, the output contacts being in a closed state across the first and second outer terminals of the potentiometer when the comparator is in the low state and being in an open state otherwise.

The value of the predetermined amount of time is based on the value of the parallel combination of the current limiting resistor, the timing resistor, and the timing capacitor within the delay timer.

BRIEF DESCRIPTION OF THE DRAWINGS

The present invention will be more readily understood from the detailed description of exemplary embodiments presented below considered in conjunction with the attached drawings, of which.

It is to be understood that the attached drawings are for purposes of illustrating the concepts of the invention and may not be to scale.

DETAILED DESCRIPTION OF THE INVENTION

Figure 1:
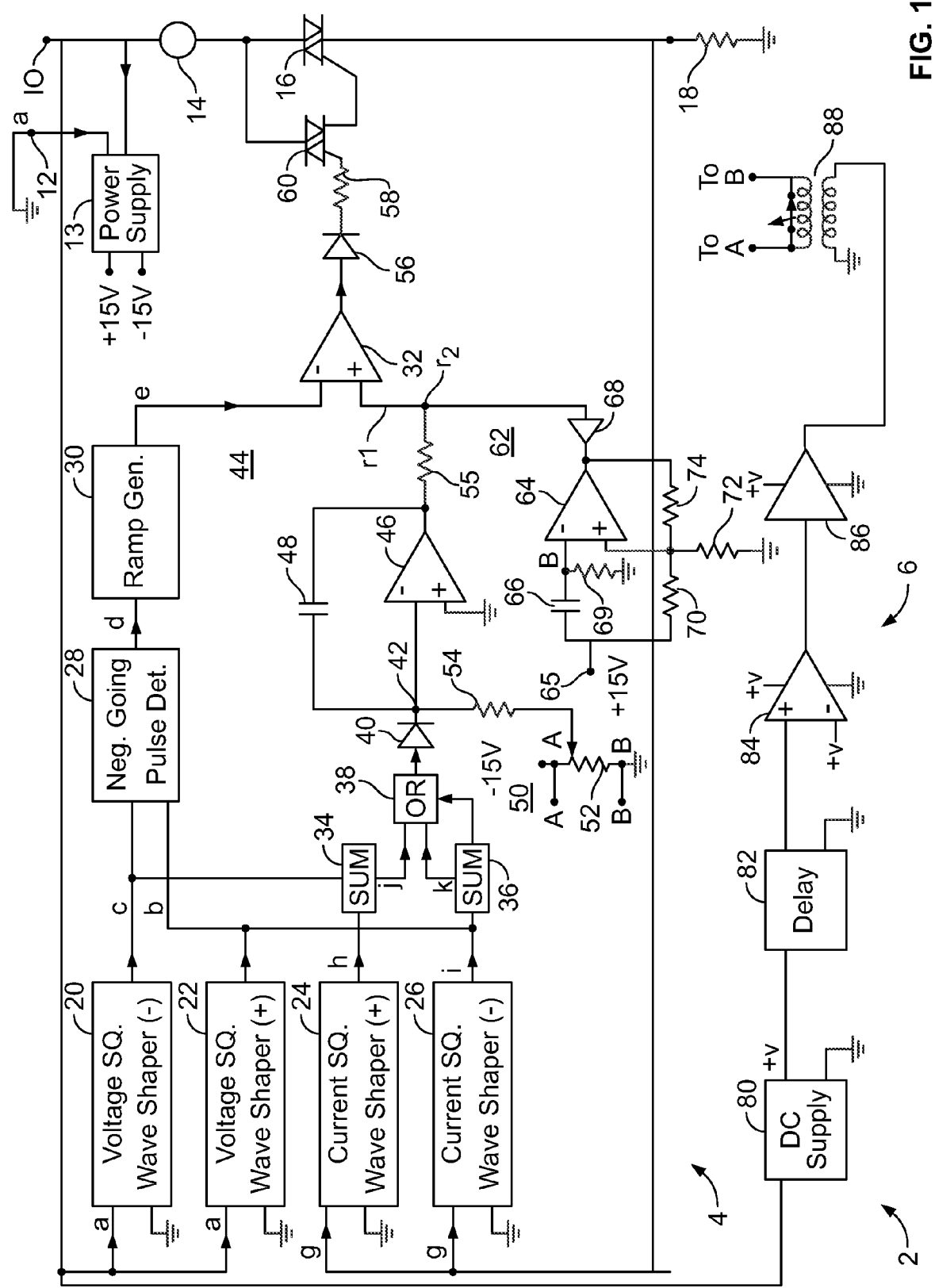
FIG. 1 is a partial schematic/block diagram of a power factor control system for AC induction motors that employs the Nola '177 circuit and a timer circuit for delaying the operation of the Nola '177 circuit, constructed in accordance with an embodiment of the present invention.

Referring now to FIG. 1, a power factor control system for AC induction motors that employs the Nola '177 circuit and a timer circuit for delaying the operation of the Nola '177 circuit is depicted, constructed in accordance with an embodiment of the present invention, and generally indicated at 2. The system 2 includes the Nola '177 circuit 4, and an energy saver delay circuit 6. The energy saver delay circuit 6 includes a DC power supply 80 derived from an alternating current source (115 volts AC and shown as waveform (a) of FIG. 3), a delay circuit 82, a comparator 84, a relay driver 86, and a normally closed, single pole-single throw relay 88, connected as shown.

The operation of the Nola '177 circuit 4 is herein described as follows. The alternating current source is connected across terminals 10 and 12. This supplies the voltage/current associated with the alternating current source to circuit bias supply 13 and across a series circuit including a winding or windings of motor 14, triac 16, and current resistor 18. The input voltage signal is also applied to voltage squaring wave shapers 20 and 22, shaper 22 providing a first phased, full wave, rectangular wave output as shown in waveform (b) of FIG. 3; and voltage squaring wave shaper 20 providing an oppositely phased, full wave, rectangular wave output as shown in waveform (c) of FIG. 3. A signal voltage across resistor 18, shown as waveform (g) in FIG. 3, and representative of motor current, is applied to the inputs of full wave current squiring wave shapers 24 and 26, shaper 24, being responsive only to the positive half cycle of current waveform (d), providing a first phased, full wave, rectangular wave output as shown in waveform (h) of FIG. 3. Wave shaper 26, being responsive only to the negative half cycle of current waveform (d), provides an oppositely phased, full wave, rectangular wave output as shown in waveform (i) of FIG. 3. The bias outputs of supply 13 power the indicated bias requirements as well as generally supply bias power to all active elements in the Nola '177 circuit 4 by connections not shown.

Figure 3:
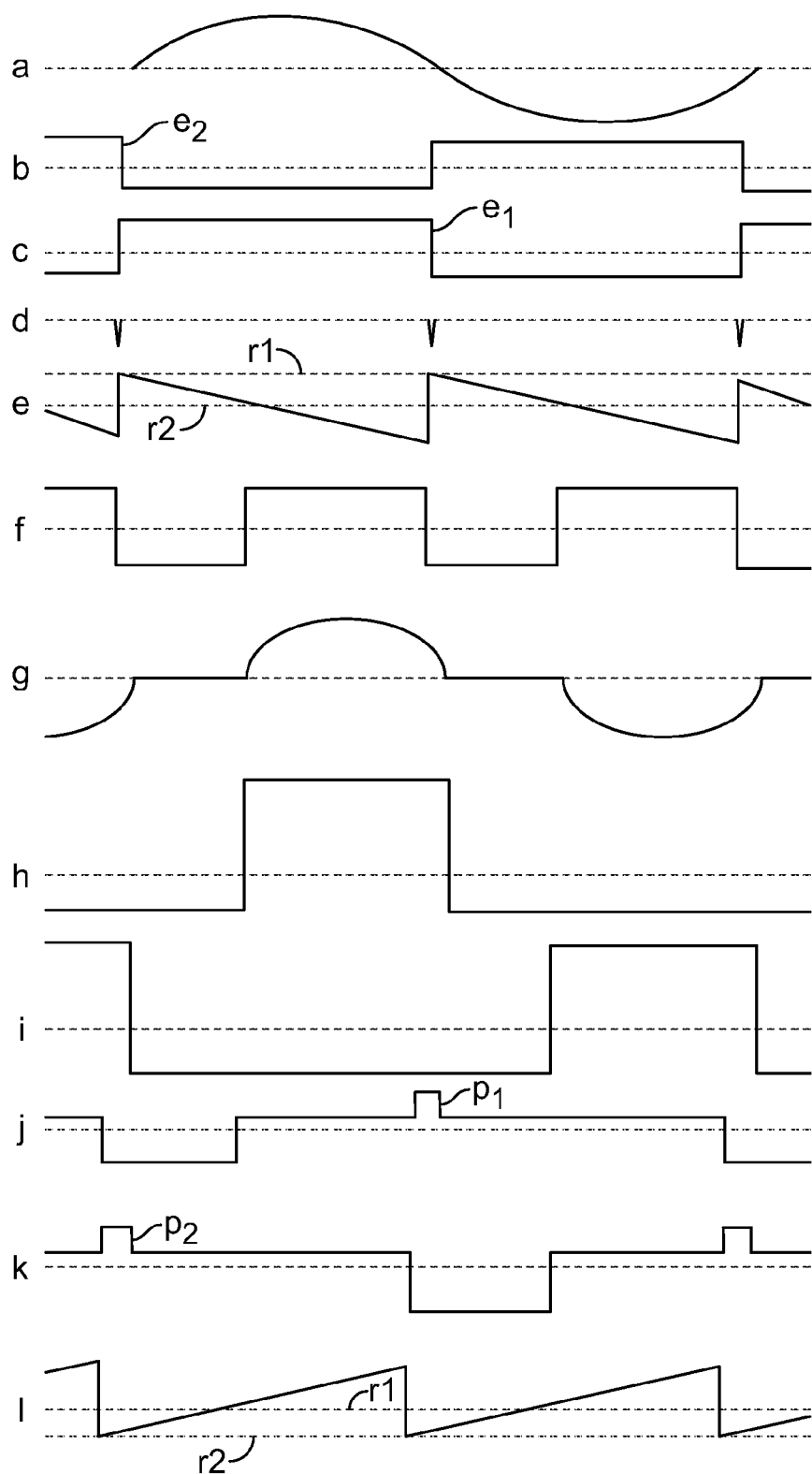
FIG. 3 shows a series of waveforms illustrating aspects of the operation of the Nola '177 circuits of FIGS. 1 and 2.

An output of each of voltage square wave shapers 20 and 22 are fed to negative going pulse detector 28 which provides a negative spike output (waveform (d) of FIG. 3). The spike pulses are then fed to ramp generator 30 which provides a ramp waveform as shown in waveform (e) of FIG. 3. This ramp waveform is applied to the (−) (inverting) input of differential or operational amplifier 32, which functions as a zero crossing detector responsive to the combination of the ramp waveform and a control signal applied to the positive (non-inverting) input of amplifier 32, as will be further explained.

The control signal is a function of phase difference between the current and voltage and a command signal. This phase difference, that is, the phase difference between the current and voltage applied to motor 14, is detected each half cycle. Phase difference is detected by a selected combination of the outputs of square wave shapers 20, 22, 24, and 26. Thus, the outputs of shapers 20 and 24 are summed in summing device 34 to provide a signal output as shown in waveform (j) of FIG. 3, and the outputs of wave shapers 22 and 26 are summed in summing device 36 to provide an output as shown in waveform (k) of FIG. 3. As a result, each of the outputs of summing devices 34 and 36 provides superimposed pulses, pulses p1 (waveform j) and p2 (waveform k), which are of a duration representative of the phase difference between applied voltage to and current through the motor 14. This occurs because, in effect, the turn-off of a summed voltage square wave established the rise point of those superimposed pulses, and the trailing edge of the current derived square wave produces the trailing edges of the superimposed pulses.

As will be noted in waveforms (j) and (k), a superimposed pulse occurs each half cycle of the AC input. In order to use them both, the outputs of summing devices 34 and 36 are fed to OR circuit 38 which presents both at its output. The output of the OR circuit 38 is fed through rectifier 40 preparatory to integration, and there is applied at junction 42 pulses p1 and p2 appearing each half cycle of signal voltage. They are of a constant height, but of variable width, width varying as a direct function of phase angle between current and voltage. Although pulses p1 and p2 are fed to summing junction 42, they alone do not appear at this point as there are two other influential circuits connected to it. The first of these is integrator 44. It functions to provide an averaged or integrated value for pulses p1 and p2, which thus converts the pulse width modulated pulses to an amplitude modulated signal.

Integrator 44 comprises an operational amplifier 46 and capacitor 48 (e.g., 1 uF), the inverting input of operational amplifier 46 being connected to summing junction 42, and capacitor 48 being connected between this point and the output of operational amplifier 46.

A third circuit connected to summing junction 42 is command signal circuit 50 comprising potentiometer 52, across which is connected a negative 15 volts source. This circuit is connected to summing junction 42 via summing resistor 54 and provides a bucking (opposite polarity) voltage to that provided by the amplitude of the detected phase difference signal. The (+) or non-inverting input of amplifier 46 is connected to a ground reference.

A command signal from circuit 50 is set with motor 14 unloaded and by adjustment of potentiometer 52. In effect, the command signal sets a selected power factor (or phase angle between current and voltage) as determined by the greatest power factor (smallest motor current-voltage phase difference) at which the motor will operate over a range of loadings to be encountered. The command signal, which appears at the output of operational amplifier 46, is a negative signal which shifts positively responsive to the presence of a higher than commanded power factor, and shifts negatively when there is detected a lower than commanded power factor. It is employed in a servo loop to vary the applied voltage and control the input power to motor 14. In this way, motor 14 is forced to operate at the selected power factor. In a typical case, it might be found that without the present control, the motor would operate with a power factor of 0.75 when fully loaded and a power factor of 0.15 when unloaded, but that with the control system of this invention, it may be operated at a relatively constant power factor of 0.85 regardless of loading conditions. In such circumstances, this enables motors which are less than fully loaded to draw significantly reduced power.

The control signal from the output of operational amplifier 46 is coupled through resistor 55 and is applied to the positive (non-inverting) input of operational amplifier 32, operating as a zero crossing detector. This control signal has the effect of varying the response of operational amplifier 32 to the ramp signal shown in waveform (e) and which is applied to the negative or inverting input of amplifier 32. Thus, with a basically zero level of control signal, represented by reference r1, being in the top position, operational amplifier 32 would be essentially fully held positive by the ramp signal, resulting in a triggering output from amplifier 32 which stays on. As a typical value of negative control signal, represented by reference r2, the relative position of reference r2 with respect to the ramp signal is such that operational amplifier 32 will be triggered on during the latter portion of each ramp signal, commencing with the intersecting of the ramp signal with reference line r2. This produces a positive pulse output from operational amplifier 32 as indicated in waveform (f) shown with approximately 50% "on" time. The output of operational amplifier 32 is applied through diode 56 and resistor 58 to the gate input of triggering or buffer triac 60, and its output is connected to the trigger input of triac 16 which is in circuit with motor 14. Accordingly, as shown, triac 16 is turned on each cycle for the pulse width of the positive pulse shown in waveform (f) for about 50% of the time of each half cycle of the AC input to motor 14. This state would typically occur for a medium loading of motor 14. If motor load should increase, this would be detected by a decreased phase angle; and in correcting this, the feedback system of the circuit would raise the control voltage and increase the turn-on time of triac 16. If the motor load is shifted downward, the opposite would occur, and turn-on time of triac 16 would be reduced. The net result is that when motor 14 is less than fully loaded, it is driven by a substantially lower average voltage, and thereby draws substantially less power than were the Nola '177 circuit 4 not employed.

As discussed above, the Nola '177 circuit 4 may be powered by relatively inexpensive transformerless power supplies for bias power supply 13. However, in such circumstances, relatively large capacitors are typically necessary, and this slows full voltage output and start-up time of the circuitry. This in turn may prevent a motor from having a sufficient starting voltage (average voltage through triac 16) initially applied to it for effective starting. To compensate for this, delay circuit 62 is shown which delays any power from being applied to motor 14 until operating biases are essentially at full operating levels. The circuit employs operational amplifier 64 and a +15 volts bias terminal 65 (from power supply 13) which is connected through 1 uF capacitor 66 to the inverting input of amplifier 64. The output of amplifier 64 is connected through diode 68, poled as shown, to the (+) input of operational amplifier 32.

With the application of power across terminals 10 and 12 and to an input of power supply 13 providing bias potential to the circuit elements, the bias potential on terminal 65 will commence rising, and this change will appear through capacitor 66 and on the inverting terminal of operational amplifier 64. This occurs as capacitor 66 is charged through resistor 69 (500K ohms); and during this occurrence, the rising positive potential on this input of amplifier 64 will produce an increasing negative signal at the output of amplifier 64. Diode 68 will then couple this potential to the (+) (non-inverting) input of operational amplifier 32 which will swamp any control output from operational amplifier 46 and initially hold a significant negative (turn-off) potential on the input of amplifier 32. This thus will prevent triac 60 from triggering triac 16. In this manner, motor 14 is initially prevented from being turned on. This state of prevention will continue until operating biases of the circuit, including the +15 volts on terminal 65, are essentially up to full potential. When this occurs, as evidenced by an essentially full +15 volts on terminal 65, capacitor 66 will become fully charged, and the input applied to the negative input of operational amplifier 64 will drop. When this occurs, the +15 volts potential on terminal 65 will be effectively applied through 51K ohm resistor 70 and across 3.9K ohm resistor 72 to the (+) input of operational amplifier 64, with the effect that amplifier 64 will be transitioned to provide a +15 volts output. This process is accelerated by positive feedback resistor 74 connected between the output and (+) input of amplifier 64. With the output positive, diode 68 is blocked, and the normal operating output from amplifier 46 is applied to the (+) input of amplifier 32. Since initially there is no current feedback from motor 14 (via resistor 18), the full command voltage would be effected to cause a full positive potential to be applied to amplifier 46 to the (+) terminal of amplifier 32 which then would cause a full turn-on potential to be applied to triac 60, and thereby to triac 16. Thus at this point, motor 14 would be enabled to quickly turn full on.

As discussed above, the delays provided by delay circuit 62 may be too short during times of high temperature stresses. In such circumstances, more time is needed for the pressures in the compressor portion of air conditioning/refrigeration systems to stabilize and for back pressures to have been eliminated. The maximum available alternating voltage should be supplied to the motor 14 for longer periods of time. One way of supplying the maximum available alternating voltage is to further prevent triac 60 from triggering triac 16 so as to prevent the motor 14 from being turned on for a longer period of time than is provided by the delay circuit 62. This can be achieved by employing the energy saver delay circuit 6.

The operation of the energy saver delay circuit 6 is herein described as follows. A DC power supply 80 derives a DC supply voltage and ground potential from the alternating current source. A separate DC power supply 80 is needed as opposed to deriving DC power from the existing bias supply 13 of the Nola '177 circuit 4 because the bias supply 13 cannot supply an adequate amount of DC power to both the Nola '177 circuit 4 and the energy saver delay circuit 6 simultaneously. The DC power supply 80 supplies power to the delay timer 82, the comparator 84, the relay driver 86, and the relay 88. The delay timer 82 applies at least a portion of the DC supply voltage to the comparator 84 for a predetermined amount of time that is greater than the maximum time needed for the pressures in the system operating under the control of the motor 14 to stabilize. This causes the comparator 84 to operate in a "low" state, which causes the relay driver 86 to output about 0 Volts, which supplies about 0 Volts to the normally-closed relay 88. The relay 88 is then configured to be in a closed position, which shorts the leads, A and B, of the potentiometer 52 of the command signal circuit 50. This a second potential to be applied to the summing junction 42 such that the command signal goes to about 0 Volts, which in turn prevents triac 60 from triggering triac 16. In this manner, motor 14 is initially prevented from being turned on, thereby causing the motor 14 to receive the maximum available voltage from the AC current source.

When the predetermined amount of time has elapsed, the output of the delay timer 82 goes to low potential, which causes the comparator 84 to switch to a "high" state, which causes the relay driver 86 to supply about 15 Volts to energize the relay 88. The relay 88 switches to the open position, thereby allowing the potentiometer 52 to return to its normal bias position, which causes the Nola '177 circuit 4 to return to normal operation indefinitely.

In most air conditioning and refrigeration systems, AC power is cycled on and off periodically. Therefore the energy saver delay circuit 6 can operate whenever power is resupplied to the AC induction motor. The time delay of the delay timer 82 should be greater than both the delay time introduced by the delay circuit 62 and the worst case stabilization time of refrigeration and air conditioning compressors. In a preferred embodiment, the delay time of the delay timer 82 is set to about 20 seconds, but in other embodiments can range between about 0 seconds to about 60 seconds.

Figure 2A:
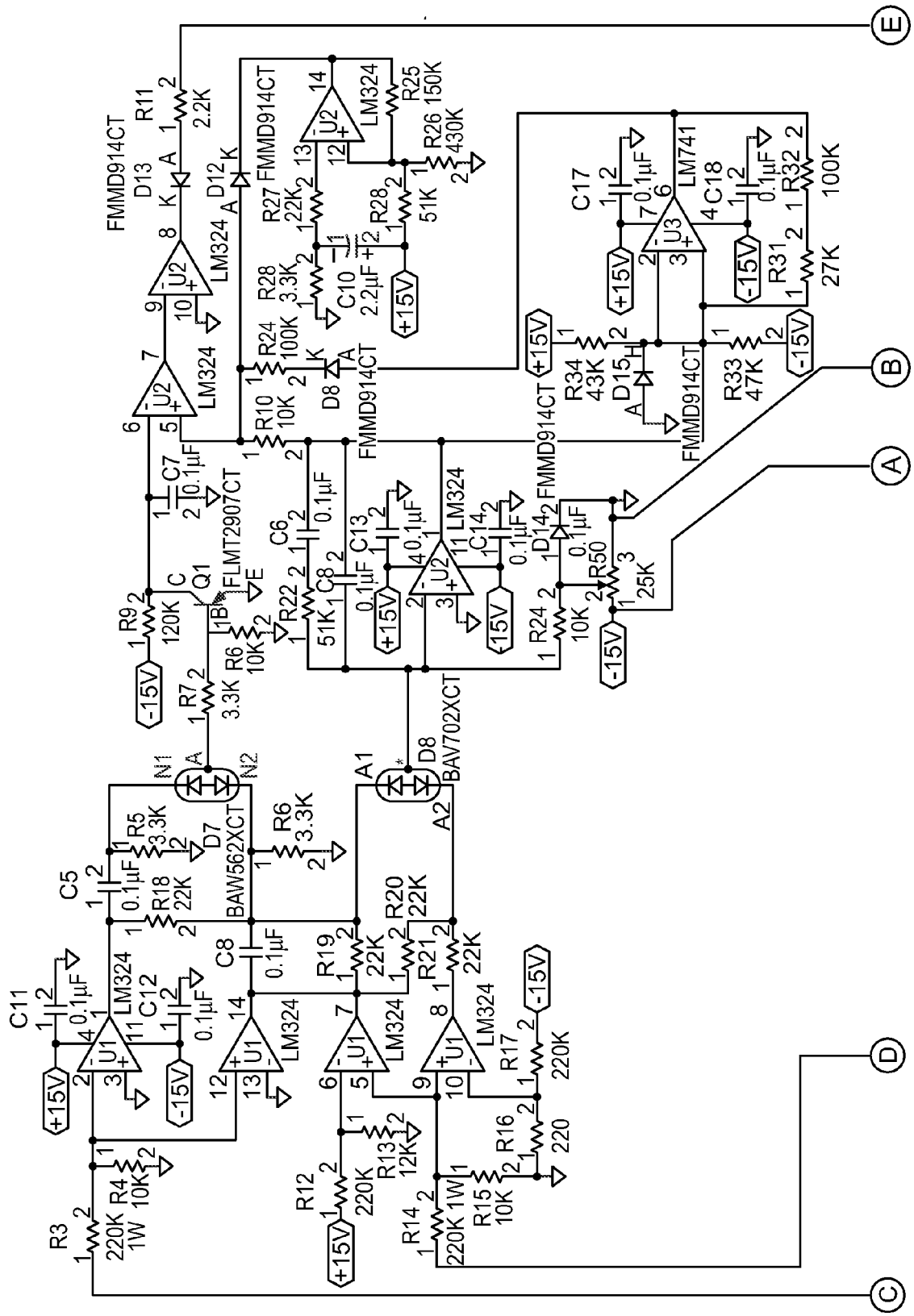
FIG. 2 is an electrical schematic diagram of a representative preferred embodiment of the Nola '177 circuit and the energy saver delay circuit of FIG. 1.
Figure 2B:
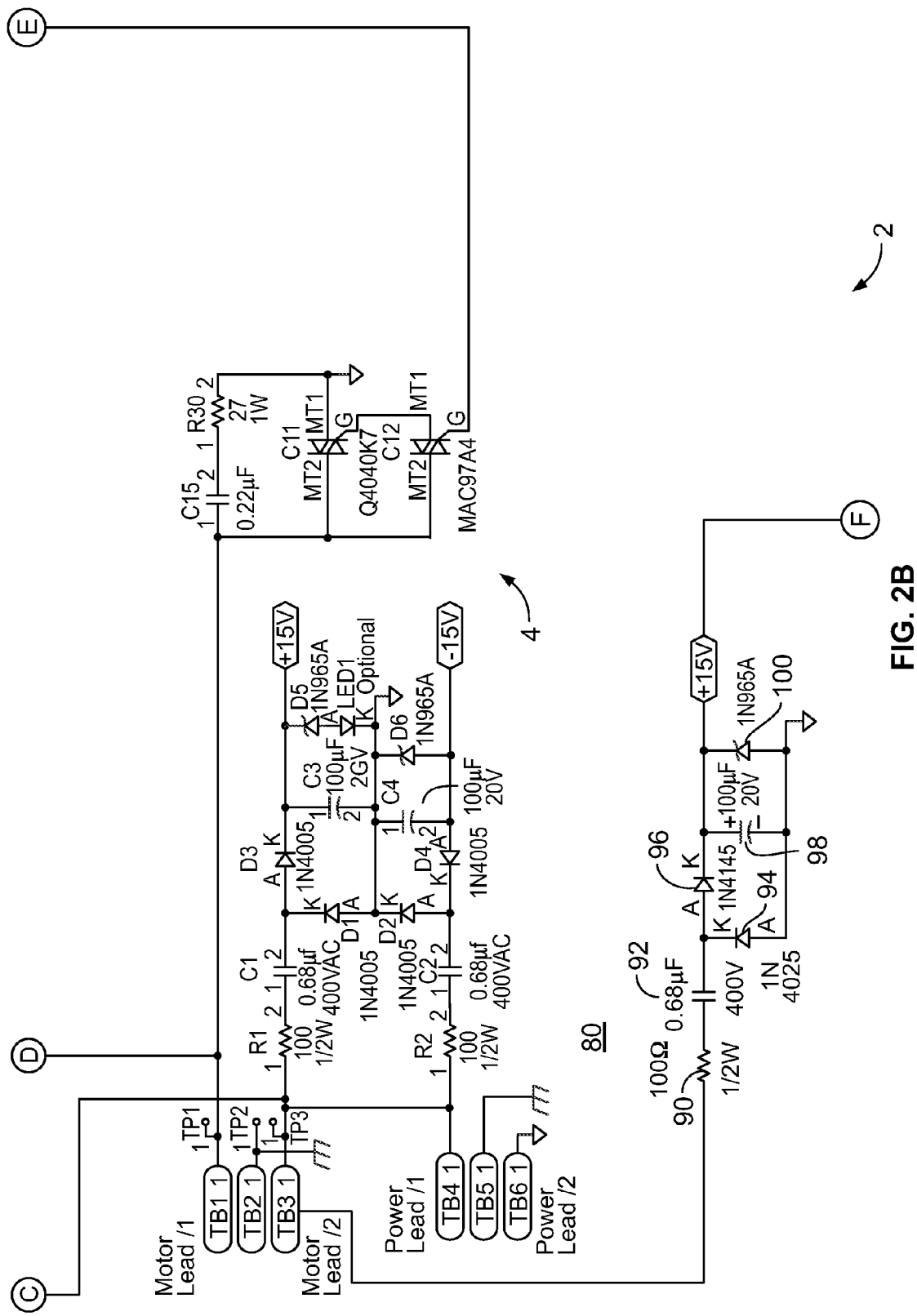
Figure 2C:
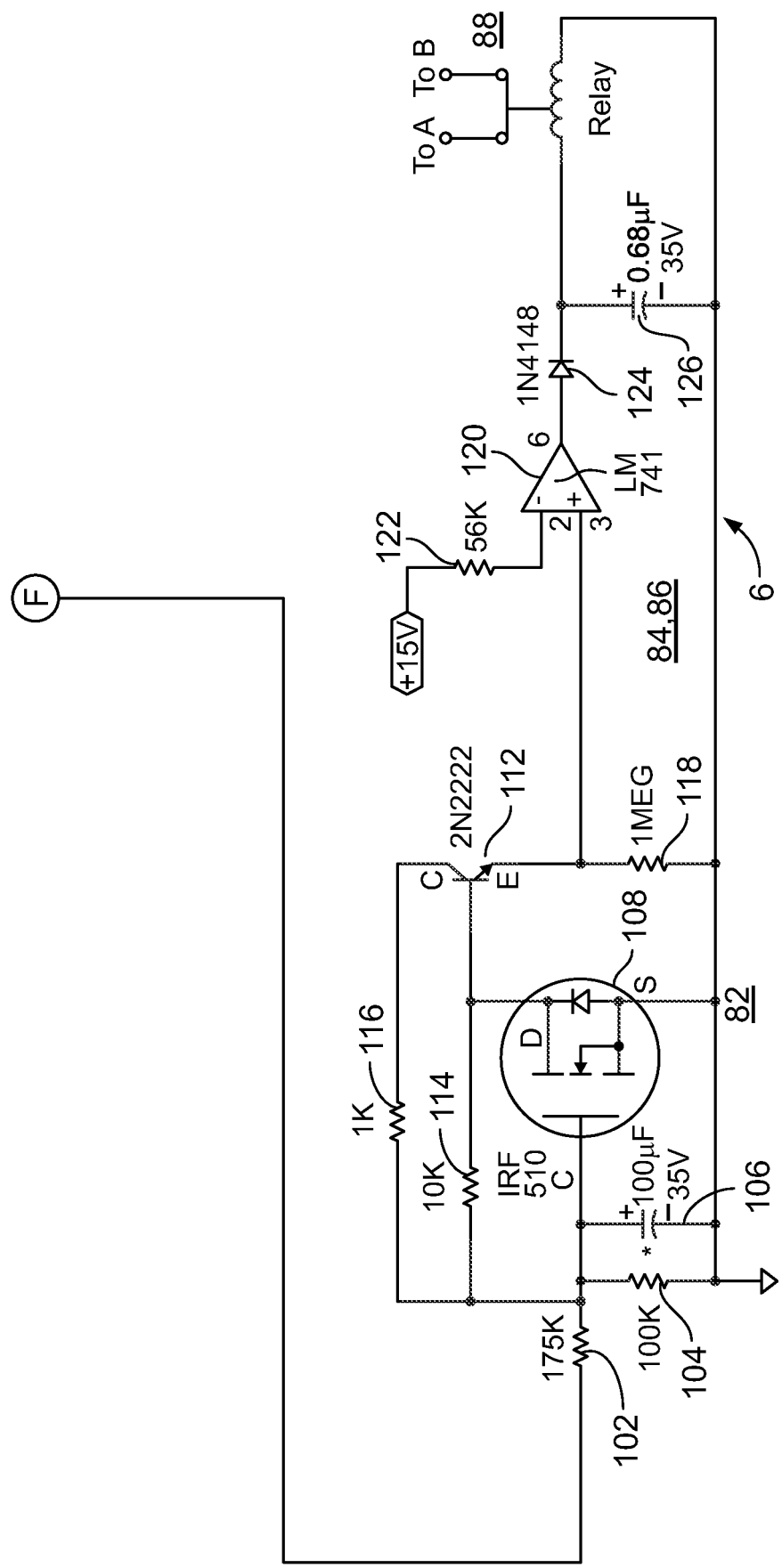

A more detailed schematic of a preferred embodiment of the Nola '177 circuit 4 and the energy saver delay circuit 6 is depicted in FIG. 2. Focusing on the implementation of the energy saver delay circuit 6, the DC power supply 80 includes 100 ohm current limiting resistor 90 and 0.68 uF AC coupling capacitor 92, which feeds AC current/voltage from the alternating current source. This AC voltage is rectified by bridge diodes 94, 96, and filtered by a 20V 100 uF capacitor 98. The voltage across capacitor 98 is further limited by 15V zener diode 100 to provide a +15 volt DC voltage to the remainder of the energy saver delay circuit 6.

The +15 V supply voltage is applied to the delay timer 82. The delay timer 82 includes a voltage divider comprising a 175K current limiting resistors 102 and a 100K resistor 104. A 100 uF polarized timing capacitor 106 is coupled in parallel with the resistor 104. One node of each of resistors 102 and 104 and capacitor 106 is electrically coupled to the gate of an N-channel depletion mode MOSFET 108, which is configured as a switch. A diode 110 is coupled across the drain and source leads of the MOSFET 108, with the source of the MOSFET 108 connected to ground potential. The drain of the MOSFET 108 is coupled to the base of an NPN transistor 112, which is configured as an emitter follower. A resistor 114 is coupled between the base of the NPN transistor 112 and the gate of the MOSFET 108, while a resistor 116 is coupled between the collector of the NPN transistor 112 and the gate of the MOSFET 108. The emitter of the NPN transistor 112 is coupled to one terminal of a 1M resistor 118.

The emitter of the NPN transistor 112 is connected to the non-inverting (+) input of an operational amplifier 120, while the inverting input (−) of the operational amplifier 120 is coupled to the +15 V DC supply via a 56K resistor 122. The operational amplifier 120 is configured to operate as both the comparator 84 and the relay driver 86 of FIG. 1. The output of the operational amplifier 120 is coupled to the anode of a diode 124. The cathode of the diode 124 is coupled to a 0.68 uF capacitor 126 and to the input coil of the relay 88. The diode 124 blocks back EMF current from the input coil of the relay 88 from flowing into the output of the operational amplifier 120. The other side of the input coil of the relay 88 is connected to ground potential. The output contacts of the relay 88 are connected to points A and B across the potentiometer 52 of the circuit 50 of the Nola '177 circuit 4.

In operation, when power is supplied by DC power supply 80 to the delay timer 82 as a result of the alternating current source being activated by the air conditioning/refrigeration system, the voltage across the timing capacitor 106 is initially about 0 volts. As a result, the N-channel MOSFET 108 is initially turned off. The NPN transistor 112 is turned on so that the voltage across the 1 Megaohm resistor is set to about +15 Volts. The operational amplifier is configured to be in a a "low" state so as to output about 0 Volts to the relay 88, which, in turn, operates in the closed state, thereby shorting points A and B connected to the potentiometer 52.

The timing capacitor 106 begins charging with a time constant equal to the value of the capacitance times the value of the parallel combination of resistors 102, 104. When the capacitor 106 is nearly charged, the MOSFET 108 switches "on" so as to "turn off" the NPN transistor 112 so that the non-inverting input of the operational amplifier 120 is set to about 0 Volts. As a result, the operational amplifier switches to a "high" state such that its output supplies about +15 Volts to the relay 88, thereby energizing it. The output contacts of the relay 88 open so as to allow the potentiometer and therefore the Nola '177 circuit 4 to return to normal operation. This process repeats as power to the motor 14 cycles off and on during operation of the refrigerator/air conditioner.

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed is:

1. A power control system for an A.C. induction motor, comprising:

a voltage/current phase difference generator for determining a difference in phase between a voltage applied to the motor and a current drawn by the motor, and for generating a phase difference signal as a function of the determined difference in phase, the voltage/current phase difference generator including an integrator, the integrator receiving the phase difference signal and generating an error signal for controlling an amount of power supplied to the motor as a function of the phase difference signal, the integrator being electrically coupled to a potentiometer, the potentiometer providing a bias signal for at least partially controlling the error signal; and a delay circuit for controlling the bias signal provided by the potentiometer so as to cause full available power to be supplied to the motor for a predetermined amount of time, wherein the potentiometer further comprises first and second outer terminals and a center tap terminal, the center tap terminal providing the bias signal, wherein the delay circuit controls the resistance appearing across the first outer terminal and second outer terminal of the potentiometer for the predetermined amount of time, and wherein the delay circuit further comprises:

a DC power supply having a DC supply voltage derived from an alternating current source;

a delay timer having an input for receiving the DC supply voltage from the DC power supply and an output for outputting at least a portion of the DC supply voltage for the predetermined amount of time;

a comparator having an input, the input of the comparator being electrically connected to the output of the delay timer, the comparator being configured to operate in a low state for the predetermined amount of time after receiving the at least a portion of the DC supply voltage from the delay timer and to operate in a high state thereafter; and a relay having a drive coil and a pair of output contacts, the drive coil being in electrical communication with and driven by the comparator, the output contacts being in a closed state across the first and second outer terminals of the potentiometer when the comparator is in the low state and being in an open state otherwise.

2. The system of claim 1, wherein the DC power supply comprises:

a current limiting resistor coupled to the alternating current source;

an AC coupling capacitor connected in series with the current limiting resistor and having an output terminal;

first and second diodes, each having anode and cathode terminals, arranged in a bridge configuration, the cathode of the first diode being electrically connected to the anode of the second diode and the electrically connected to the output terminal of the AC coupling capacitor for rectifying an AC voltage supplied by the alternating current source;

a second capacitor having an input and output terminal, the input terminal of the second capacitor being electrically connected to the cathode of the second diode and the second terminal of the second capacitor being electrically connected to the anode of the first diode for filtering the rectified voltage; and a zener diode electrically connected in parallel with the second capacitor for providing the DC supply voltage.

3. The system of claim 2, wherein the delay timer comprises:

a voltage divider comprising a current limiting resistor and a timing resistor connected in series;

a timing capacitor coupled in parallel with the timing resistor;

an N-channel depletion mode MOSFET, the gate of the MOSFET being electrically connected to one terminal each of the current limiting resistor, the timing resistor, and the timing capacitor, the source of the MOSFET being electrically connected to each of the other terminals of the timing resistor and timing capacitor;

a third diode coupled across the drain and source leads of the MOSFET;

an NPN transistor, the base of the NPN transistor being electrically connected to the drain of the MOSFET;

a third resistor coupled between the base of the NPN transistor and the gate of the MOSFET;

a fourth resistor coupled between the collector of the NPN transistor and the gate of the MOSFET; and a fifth resistor having a first and second terminal, the first terminal of the fifth resistor being coupled to the emitter of the NPN transistor and the second terminal of the fifth resistor being coupled to the source of the MOSFET.

4. The system of claim 3, wherein the comparator comprises:

an operational amplifier having an inverting input, a non-inverting input, and an output, the non-inverting input of the operational amplifier being electrically connected to the emitter of the NPN transistor; and a sixth resistor having first and second terminals, the first terminal of the sixth resistor being electrically connected to the inverting input of the operational amplifier and the second terminal of the sixth resistor being electrically connected to the DC supply voltage.

5. The system of claim 4, further comprising:

a fourth diode having a cathode and an anode, the anode of the fourth diode being electrically connected to the output of the operational amplifier and the cathode of the fourth diode being electrically connected to a first terminal of the input coil of the relay; and a third capacitor having an input and output terminal, the input terminal of the third capacitor being electrically connected to the cathode of the fourth diode and the second terminal of the third capacitor being electrically connected the source of the MOSFET and a second terminal of the input coil of the relay.

6. The system of claim 3, wherein the value of the predetermined amount of time is based on the value of the parallel combination of the current limiting resistor, the timing resistor, and the timing capacitor.

7. An energy saver delay circuit for controlling a power control system for an A.C. induction motor, the power control system including an integrator, the integrator being electrically coupled to a potentiometer, the potentiometer having first and second outer terminals and a center tap terminal, the center tap terminal providing a first a bias signal for at least partially controlling the amount of power delivered to the A.C. induction motor, comprising a delay circuit for controlling the bias signal provided by the potentiometer so as to cause full available power to be supplied to the motor for a predetermined amount of time, the delay circuit controlling the resistance appearing across the first outer terminal and second outer terminal of the potentiometer, wherein the delay circuit further comprises:

a DC power supply having a DC supply voltage derived from an alternating current source;

a delay timer having an input for receiving the DC supply voltage from the DC power supply and an output for outputting at least a portion of the DC supply voltage for the predetermined amount of time;

a comparator having an input, the input of the comparator being electrically connected to the output of the delay timer, the comparator being configured to operate in a low state for the predetermined amount of time after receiving the at least a portion of the DC supply voltage from the delay timer and to operate in a high state thereafter; and a relay having a drive coil and a pair of output contacts, the drive coil being in electrical communication with and driven by the comparator, the output contacts being in a closed state across the first and second outer terminals of the potentiometer when the comparator is in the low state and being in an open state otherwise.

8. The circuit of claim 7, wherein the DC power supply comprises:

a current limiting resistor coupled to the alternating current source;

an AC coupling capacitor connected in series with the current limiting resistor and having an output terminal;

first and second diodes, each having anode and cathode terminals, arranged in a bridge configuration, the cathode of the first diode being electrically connected to the anode of the second diode and the electrically connected to the output terminal of the AC coupling capacitor for rectifying an AC voltage supplied by the alternating current source;

a second capacitor having an input and output terminal, the input terminal of the second capacitor being electrically connected to the cathode of the second diode and the second terminal of the second capacitor being electrically connected to the anode of the first diode for filtering the rectified voltage; and a zener diode electrically connected in parallel with the second capacitor for providing the DC supply voltage.

9. The circuit of claim 8, wherein the delay timer comprises:

a voltage divider comprising a current limiting resistor and a timing resistor connected in series;

a timing capacitor coupled in parallel with the timing resistor;

an N-channel depletion mode MOSFET, the gate of the MOSFET being electrically connected to one terminal each of the current limiting resistor, the timing resistor, and the timing capacitor, the source of the MOSFET being electrically connected to each of the other terminals of the timing resistor and timing capacitor;

a third diode coupled across the drain and source leads of the MOSFET;

an NPN transistor, the base of the NPN transistor being electrically connected to the drain of the MOSFET;

a third resistor coupled between the base of the NPN transistor and the gate of the MOSFET;

a fourth resistor coupled between the collector of the NPN transistor and the gate of the MOSFET; and a fifth resistor having a first and second terminal, the first terminal of the fifth resistor being coupled to the emitter of the NPN transistor and the second terminal of the fifth resistor being coupled to the source of the MOSFET.

10. The circuit of claim 9, wherein the comparator comprises:

an operational amplifier having an inverting input, a non-inverting input, and an output, the non-inverting input of the operational amplifier being electrically connected to the emitter of the NPN transistor; and a sixth resistor having first and second terminals, the first terminal of the sixth resistor being electrically connected to the inverting input of the operational amplifier and the second terminal of the sixth resistor being electrically connected to the DC supply voltage.

11. The circuit of claim 10, further comprising:

a fourth diode having a cathode and an anode, the anode of the fourth diode being electrically connected to the output of the operational amplifier and the cathode of the fourth diode being electrically connected to a first terminal of the input coil of the relay; and a third capacitor having an input and output terminal, the input terminal of the third capacitor being electrically connected to the cathode of the fourth diode and the second terminal of the third capacitor being electrically connected the source of the MOSFET and a second terminal of the input coil of the relay.

12. The circuit of claim 11, wherein the value of the predetermined amount of time is based on the value of the parallel combination of the current limiting resistor, the timing resistor, and the timing capacitor.

13. A method for controlling a power control system for an A.C. induction motor, the power control system including an integrator, the integrator being electrically coupled to a potentiometer, the potentiometer having first and second outer terminals and a center tap terminal, the center tap terminal providing a first a bias signal for at least partially controlling the amount of power delivered to the A.C. induction motor, comprising the steps of:

controlling the bias signal provided by the potentiometer so as to cause full available power to be su lied to the motor for a redetermined amount of time said step of controlling the bias signal further including the step of varying the resistance appearing across the first outer terminal and second outer terminal of the potentiometer;

providing a DC supply voltage derived from an alternating current source to a delay circuit;

outputting at least a portion of the DC supply voltage from the delay circuit for the predetermined amount of time;

causing an output of a comparator to operate in a low state for the predetermined amount of time and operate in a high state thereafter; and causing a relay to operate in a closed state when the comparator is in the low state and energizing the relay to an open state when the comparator is in a high state, the closed state and open state of the relay determining the resistance appearing across the first outer terminal and second outer terminal of the potentiometer.

* * * * *